US012677186B2

(12) United States Patent
Zhao

(10) Patent No.: US 12,677,186 B2
(45) Date of Patent: Jul. 7, 2026

(54) REALLOCATION OF PROCESSING LOAD BETWEEN BASEBAND UNITS

(71) Applicant: Telefonaktiebolaget LM Ericsson (publ), Stockholm (SE)

(72) Inventor: Yufeng Zhao, Upplands Väsby (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 343 days.

(21) Appl. No.: 17/927,912

(22) PCT Filed: May 29, 2020

(86) PCT No.: PCT/SE2020/050544
§ 371 (c)(1),
(2) Date: Nov. 28, 2022

(87) PCT Pub. No.: WO2021/242153
PCT Pub. Date: Dec. 2, 2021

(65) Prior Publication Data
US 2023/0209389 A1 Jun. 29, 2023

(51) Int. Cl.
*H04W 36/22* (2009.01)
*H04W 28/02* (2009.01)
(52) U.S. Cl.
CPC ....... *H04W 28/0247* (2013.01); *H04W 36/22* (2013.01)
(58) Field of Classification Search
None
See application file for complete search history.

(56) References Cited

U.S. PATENT DOCUMENTS 9,867,034 B2 * 1/2018 Choi ...................... H04L 25/00
2014/0269322 A1 9/2014 Li et al.
2014/0301265 A1 10/2014 Liu et al.
(Continued)

FOREIGN PATENT DOCUMENTS

EP 2 953 399 A1 12/2015

OTHER PUBLICATIONS

International Search Report and Written Opinion issued in International Application No. PCT/SE2020/050544 dated Feb. 17, 2021 (13 pages).

*Primary Examiner* — Kodzovi Acolatse
(74) *Attorney, Agent, or Firm* — Rothwell, Figg, Ernst & Manbeck, P.C.

(57) ABSTRACT

A method performed by a control node for handling data traffic between a Transmission and Reception Point, TRP, and a User Equipment, UE, in a wireless communications network is provided. The TRP is related to a network node and is serving the data traffic in a first sector carrier. The data traffic in the first sector carrier is processed by a first Baseband Unit, BBU. The control node decides (201) to re-allocate the processing of the data traffic in the first BBU to a second BBU. The second BBU processes data traffic in a second sector carrier provided by the TRP. The control node sends (203) a second order to the network node, to stop processing the UE 120 data traffic in the first BBU. The control node further sends (205) a third order to the network node, to activate the second sector carrier, start processing the data traffic in the second BBU, and deactivate the first sector carrier.

15 Claims, 12 Drawing Sheets

(56)        References Cited

U.S. PATENT DOCUMENTS

2015/0237571 A1*   8/2015  Laraqui ................ H04W 24/10
                                                    370/332
2016/0029205 A1*   1/2016  Sirotkin ............... H04W 24/02
                                                    455/418
2018/0287696 A1*  10/2018  Barbieri ............... H04W 36/08
2018/0310352 A1*  10/2018  Wiberg ................ H04W 76/16
2019/0306742 A1*  10/2019  Yang ................ H04W 28/0215
2021/0359719 A1*  11/2021  Wang ..................... H04B 3/52
2023/0155703 A1*   5/2023  Palreddy ........... H04B 7/18506
                                                    375/224
2023/0209389 A1*   6/2023  Zhao .................... H04W 36/06
                                                    370/235

* cited by examiner

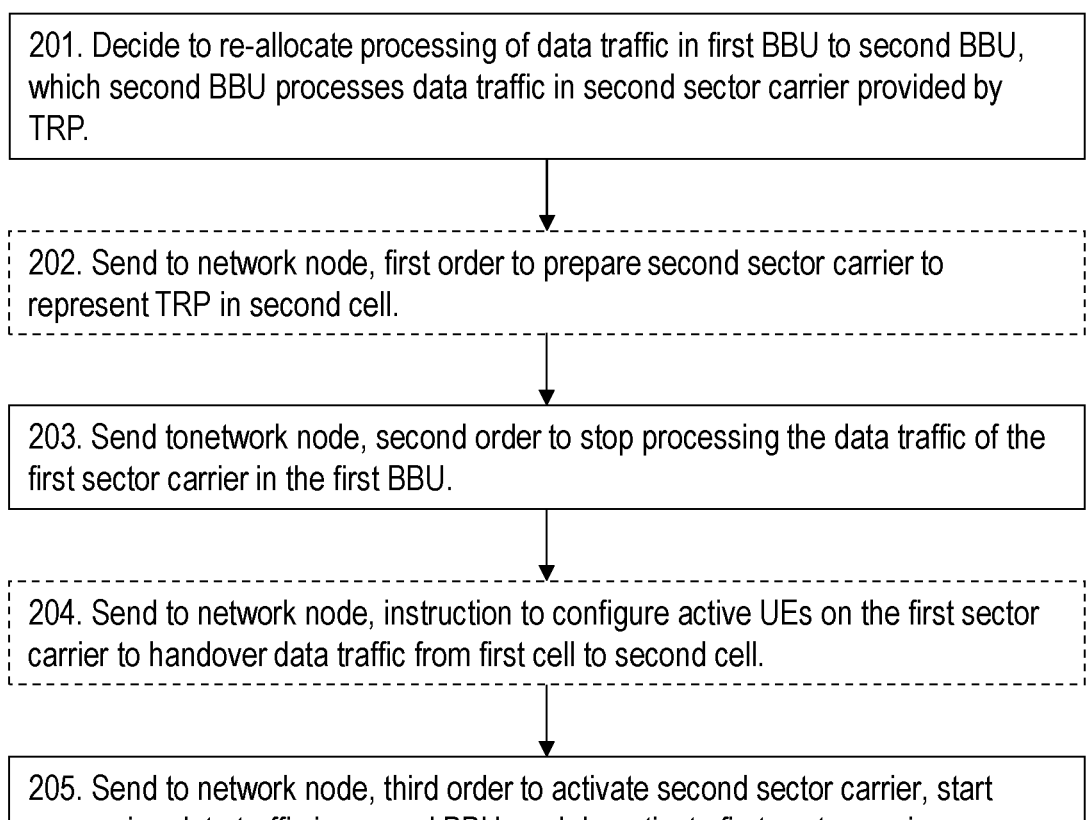

201. Decide to re-allocate processing of data traffic in first BBU to second BBU, which second BBU processes data traffic in second sector carrier provided by TRP.

202. Send to network node, first order to prepare second sector carrier to represent TRP in second cell.

203. Send tonetwork node, second order to stop processing the data traffic of the first sector carrier in the first BBU.

204. Send to network node, instruction to configure active UEs on the first sector carrier to handover data traffic from first cell to second cell.

205. Send to network node, third order to activate second sector carrier, start processing data traffic in second BBU, and de-activate first sector carrier.

Fig. 2

301. Prepare second sector carrier to represent TRP in second cell.

302. Stop processing data traffic of the first sector carrier in first BBU.

303. Configure UE to handover data traffic from first cell to second cell.

304. Activate second sector carrier, start processing data traffic in second BBU, and de-activate first sector carrier.

Computer program 670

Carrier 680

Memory 660

Processor 650

Input/Output Interface 600

Network node 109

Preparing Unit 610

Stopping Unit 620

Configuring Unit 630

Activating Unit 640

De-activating Unit 645

Network node 109

REALLOCATION OF PROCESSING LOAD BETWEEN BASEBAND UNITS

CROSS REFERENCE TO RELATED APPLICATIONS

This application is a 35 U.S.C. § 371 National Stage of International Patent Application No. PCT/SE2020/050544, filed 2020 May 29.

TECHNICAL FIELD

Embodiments herein relate to a network node, a Transmission and Reception Point (TRP) and methods therein. In some aspects, they relate to handling data traffic between the TRP and a UE in a wireless communications network (100).

Embodiments herein further relates to computer programs and carriers corresponding to the above methods and network nodes.

BACKGROUND

In a typical wireless communication network, wireless devices, also known as wireless communication devices, mobile stations, stations (STA) and/or User Equipment (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) or Next Generation (NG). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Baseband refers to the original frequency range of a transmission signal before it is modulated. A baseband unit (BBU) is a unit that processes baseband in telecomm systems. A typical base station comprises a BBU and an Radio Frequency (RF) processing unit also referred to as a remote radio unit—RRU. The BBU may e.g. be located in an equipment room of a base station and may be connected with the RRU via optical fiber.

In a radio access network, a Transmission Reception Point (TRP) is a term that is used when referring to the geographical position from where radio transmission is emitted. A TRP comprises an antenna array with one or more antenna elements available to the wireless communications network located at a specific geographical location for a specific area, see 3GPP 38.913. Sector Carriers represent spectrum and power resources of each TRP included in a cell. A cell may have one to many sector carriers, see 3GPP 28.541. A TRP provides radio access to UEs in the radio access network. The TRP may be located at a specific geographical location for providing radio coverage for a specific area. Data traffic served by this TRP is processed on a BBU. Processed by the BBU, when used herein means utilize Central Processing Unit (CPU) cycles and memory of the BBU. The BBU has a defined compute capacity to support a certain number of cells, sector carriers, users and throughput etc.

A problem with prior art will be developed and discussed below.

SUMMARY

An object of embodiments herein is to improve the performance in a wireless communications network using Baseband Units (BBUs).

According to an aspect, the object is achieved by a method performed by a control node for handling data traffic between a Transmission and Reception Point, TRP, and a User Equipment, UE, in a wireless communications network. The TRP is related to a network node and is serving the data traffic in a first sector carrier. The data traffic in the first sector carrier is processed by a first Baseband Unit, BBU.

The control node decides to re-allocate the processing of the data traffic in the first BBU to a second BBU. The second BBU processes data traffic in a second sector carrier provided by the TRP.

The control node sends a second order to the network node, to stop processing the UE 120 data traffic in the first BBU.

The control node further sends a third order to the network node, to activate the second sector carrier, start processing the data traffic in the second BBU, and deactivate the first sector carrier.

According to another aspect, the object is achieved by a method performed by a network node for handling data traffic between a Transmission and Reception Point, TRP, and a User Equipment, UE, in a wireless communications network. The TRP is related to the network node and is serving the data traffic in a first sector carrier. The data traffic in the first sector carrier is processed by a first Baseband Unit, BBU.

Triggered by a second order, the network node stops to process the UE 120 data traffic in the first BBU. The second order is received from a control node in the wireless communications network when decided to re-allocate the processing of the data traffic in the first BBU to a second BBU.

Triggered by a third order, the network node activates the second sector carrier, starts to processing the data traffic in the second BBU, and deactivates the first sector carrier, which third order is received from the control node, which second BBU processes data traffic in a second sector carrier provided by the TRP.

According to another aspect, the object is achieved by a control node configured to handle data traffic between a Transmission and Reception Point, TRP, and a User Equipment, UE, in a wireless communications network. The TRP is related to a network node and is adapted to serve data traffic in a first sector carrier. The data traffic in the first sector carrier further is adapted to be processed by a first Baseband Unit, BBU. The control node is further configured to:

Decide to re-allocate the processing of the data traffic in the first BBU to a second BBU, which second BBU is adapted to process data traffic in a second sector carrier provided by the TRP, send a second order to the network node, to deactivate the first sector carrier and stop processing the data traffic in the first BBU, and send a third order to the network node, to activate the second sector carrier, start processing the data traffic in the second BBU, and deactivate the first sector carrier.

According to another aspect, the object is achieved by a network node configured to handle data traffic between a Transmission and Reception Point, TRP, and a User Equipment, UE, in a wireless communications network. The TRP is related to the network node is adapted to serve the data traffic in a first sector carrier. The data traffic in the first sector carrier is adapted to be processed by a first Baseband Unit, BBU. The TRP is further configured to:

Triggered by a second order, deactivate the first sector carrier and stop processing the data traffic in the first BBU, which second order is adapted to be received from a control node in the wireless communications network when decided to re-allocate the processing of the data traffic in the first BBU to a second BBU, and triggered by a third order, activate the second sector carrier, start processing the data traffic in the second BBU, and deactivate the first sector carrier, which third order is adapted to be received from the control node, which second BBU is adapted to process data traffic in a second sector carrier provided by the TRP.

An advantage of embodiments herein is that the provided method will dynamically re-allocate a sector carrier to another BBU, multiple BBUs may be used as pooled HW for load balance, the BBU HW utilization may be scaled with traffic load for energy efficiency, and inter-sector carrier coordination may be optimized. This results in that the performance in a wireless communications network using BBUs is improved.

A further advantage is that they also improve Hardware (HW) utilization and provide flexibility.

BRIEF DESCRIPTION OF THE DRAWINGS

FIG. 2 is a flow chart depicting embodiments of a method in a network node.

DETAILED DESCRIPTION

Figure 1A:
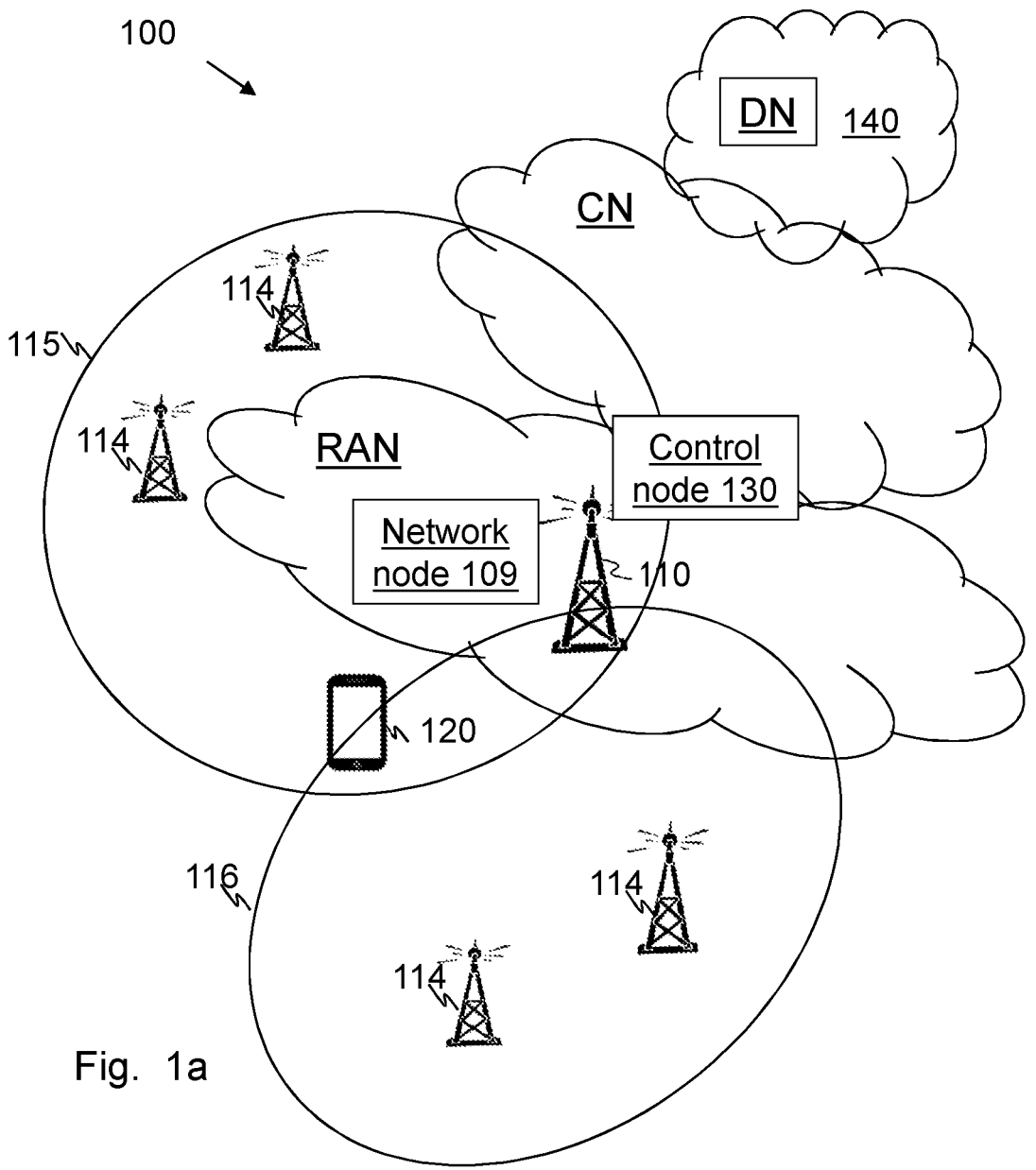
FIGS. 1a, 1b, and 1c are schematic block diagrams depicting embodiments of a wireless communication network.

As a part of developing embodiments herein the inventors identified a problem with prior art which first will be discussed.

A BBU must be able to manage peak load situations. The traffic load varies a lot during time therefore peak traffic load only happens in a small percent of the time, which leads to low average BBU Hardware (HW) utilization.

Peak load of different TRPs usually does not happen simultaneously. By run-time re-allocating processing of data traffic to another BBU, the processing load may be balanced among a pool of BBUs. The term run-time when used herein means no need to re-configure a cell or drop of UE data traffic. The wording run-time re-allocate TRP when used herein means to change the processing HW for the UE traffic carried by a TRP without drop of UE data traffic. In average, the HW utilization is improved and required HW may be reduced. During non-busy hours, TRPs may also be re-allocated to fewer BBUs to gain energy efficiency.

The re-allocating of the TRP processing to another BBU may be done by re-configuring the cell that represents the TRP to another BBU. However, the cell will be homed by on another BBU and get another cell Identity (cellId). This will mess up the cell level management. The wording "the cell will be homed" when used herein means that the cell ID, cell data for configuration management, performance management and fault management are stored and/or connected to the BBU.

The existing Centralized RAN (CRAN) deployment, only co-locate BBUs to the same site. Each BBU has an individual capacity. Due to the nature of traffic variation, some BBUs may be over-loaded while other may be under loaded at the same time. There is no solution to run-time balance the BBU load and at the same time keep cell level management.

To reduce risk that peak load exceeds the BBU capacity, one solution provides to over dimension the BBU to handle peak load. Drawbacks of this solution are that it results in very low average HW utilization. Higher Capital Expenses (CAPEX) due to more over dimensioned BBUs is needed and higher Operating Expenses (OPEX) due to energy cost per BBU. There may not be enough space to have many BBUs.

To balance processing load on BBUs one solution is to shut down a cell on high loaded BBU and move it to low loaded BBU. Drawbacks of this solution are that this will introduce cell down time and drop of traffic. It is complicated to keep cell level management due to that the cell changed home BBU and most probably also the NodeB.

Another solution to balance processing load on BBUs is to move traffic to neighbor cells before shutting down the cell in the above solution. Drawbacks of this solution is that it is no guarantee that there is a neighbor cell to move the UE to. It is complicated to keep the cell level management due to that the cell changed home BBU and most probably also the NodeB.

A further solution to balance processing load on BBUs is to move a UE to neighbor cells to balance cell load. Drawbacks of this solution is that the neighbor cell may not locate the processed data traffic on the suitable BBU. The BBU HW load cannot be balanced by this method.

An object of embodiments herein is to improve the performance and the HW utilization in a wireless communications network using Baseband Units (BBUs).

Example of embodiments herein relates to run-time sector carrier re-allocation between BBUs. Embodiments herein provide methods to run-time balance the BBU load and at the same time keep cell level management. According to embodiments herein, the sector carrier is not shut down and neither the cell is shut down.

Embodiments herein further enable BBU pooling. The wording BBU pooling when used herein means the processing of UE traffic may be re-allocate to different BBUs.

A TRP is represented by sector carrier. The same spectrum and power resources of a TRP may be presented in multiple cells by different sector carriers. (E.g. see reference 141, SC3, 142 and SC3' in FIG. 1*c* described below.) A cell may comprise multiple TRPs therefore have multiple sector carriers. (E.g. see reference first cell 115, second cell 116, 141 and 142 in FIG. 1*c* described below).

The re-allocation may be performed by run-time switching an active sector carrier to present the TRP. The cell level management may then be kept untouched. This is since the sector carrier is only part of a cell. No need to change cell ID or lock and/or unlock a cell to activate or de-activate a sector carrier. Some embodiments herein further provide a handover procedure to coordinate the de-activating the sector carrier on the source BBU and activating the sector carrier on the target BBU.

An advantage of embodiments herein is that the provided method will have no impact on cell level management. The UE is handed over to the multi-TRP cell on the target BBU, thus the impact on traffic is minimized. There will be no cell down time and no drop of connection with the UE. The wording cell down time means a period of time during which a UE cannot be connected to the cell.

A further advantage of embodiments herein is that they may be applied on both LTE and NR, both on embedded BBUs and on cloud BBUs.

A yet further advantage of embodiments herein is that by dynamically re-allocate a sector carrier to another BBU, multiple BBUs may be used as pooled HW for load balance, the HW utilization may be scaled with traffic load for energy efficiency, and inter-sector carrier coordination may be optimized.

Figure 1B:
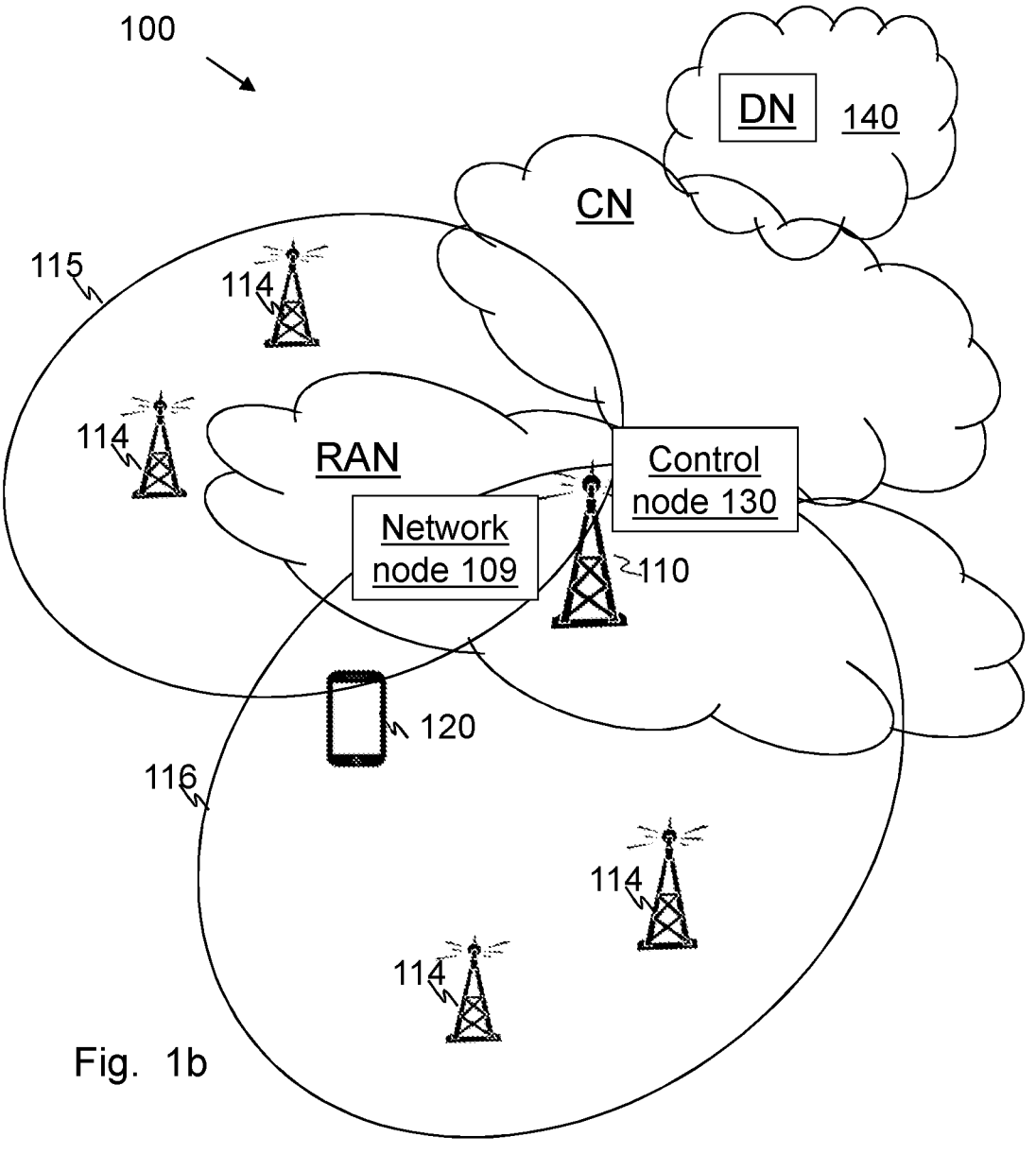

FIG. 1*a* and FIG. 1*b* are schematic overviews depicting a wireless communications network 100 wherein embodiments herein may be implemented. FIG. 1*a* depicts a scenario before re-allocating processing of data traffic from a first BBU to a second BBU. FIG. 1*b* depicts a scenario after re-allocating the processing of data traffic from the first BBU to the second BBU according to embodiments herein. The wireless communications network 100 comprises one or more RANs and one or more CNs. The wireless communications network 100 may use 5 Fifth Generation New Radio, (5G NR) but may further use a number of other different Radio Access Technologies (RAT)s, such as, Wi-Fi, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. According to some embodiments herein, a first RAT may e.g. be any one out of LTE or NR. A second RAT may e.g. be LTE if the first RAT is NR or NR if the first RAT is LTE.

Network nodes such as a network node 109 operate in the wireless communications network 100. The network node 109 operates and or controls one or more TRPs such as a TRP 110 and one or more other TRPs 114. The network node 109 further may control and one or more BBUs such as a first BBU 111 and a second BBU 112 shown in FIG. 1*c* described below. The TRP 110 and the other TRPs 114 each provides radio access in one or more cells by means of one or more second sector carriers, such as e.g. the TRP 110 provides a first sector carrier in the first cell 115 and a second sector carrier in the second cell 116. FIG. 1*a* depicts the first cell 115 and the second cell 116 in a scenario before re-allocating processing of data traffic from a first BBU to a second BBU. FIG. 1*b* depicts the first cell 115 and the second cell 116 in a scenario after re-allocating the processing of data traffic from the first BBU to the second BBU according to embodiments herein.

The TRP 110 may comprise antennas covering areas. The TRP 110 may be a part of a network comprising BBUs. The network node 109, the TRP 110, the first and second BBUs 111, 112, may be co-located on the same node or may be separated to different nodes.

The network node 109 may provide transmission and reception points and may e.g. be a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (VVLAN) access point, an Access Point Station (AP STA), an access controller, a UE acting as an access point or a peer in a Device to Device (D2D) communication, or any other network unit capable of communicating with a UE within the cell served by network node 110 depending e.g. on the radio access technology and terminology used.

Other network nodes such as a control node 130 operate in the wireless communications network 100. The location and implementation of the control node 130 may be very flexible; both inside or outside a base station such as the network node 109 is possible.

The control node 130 may provide control functions and may be a standalone node or may be collocated with the network node 109 or any other network node or distributed node in a cloud. The control node 130 may control data traffic between the TRP 110 and a UE 120 in the wireless communications network 100.

Wireless devices such as the UE 120 operate in the wireless communications network 100. The UE 120 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the TRP 110, one or more RANs to one or more CNs. It should be understood by the skilled in the art that the UE 120 relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Methods herein may be performed by the control node 130 and the network node 109. As an alternative, a Distributed Node (DN) and functionality, e.g. comprised in a cloud 140 as shown in FIG. 1*a*, may be used for performing or partly performing the methods.

Figure 1C:
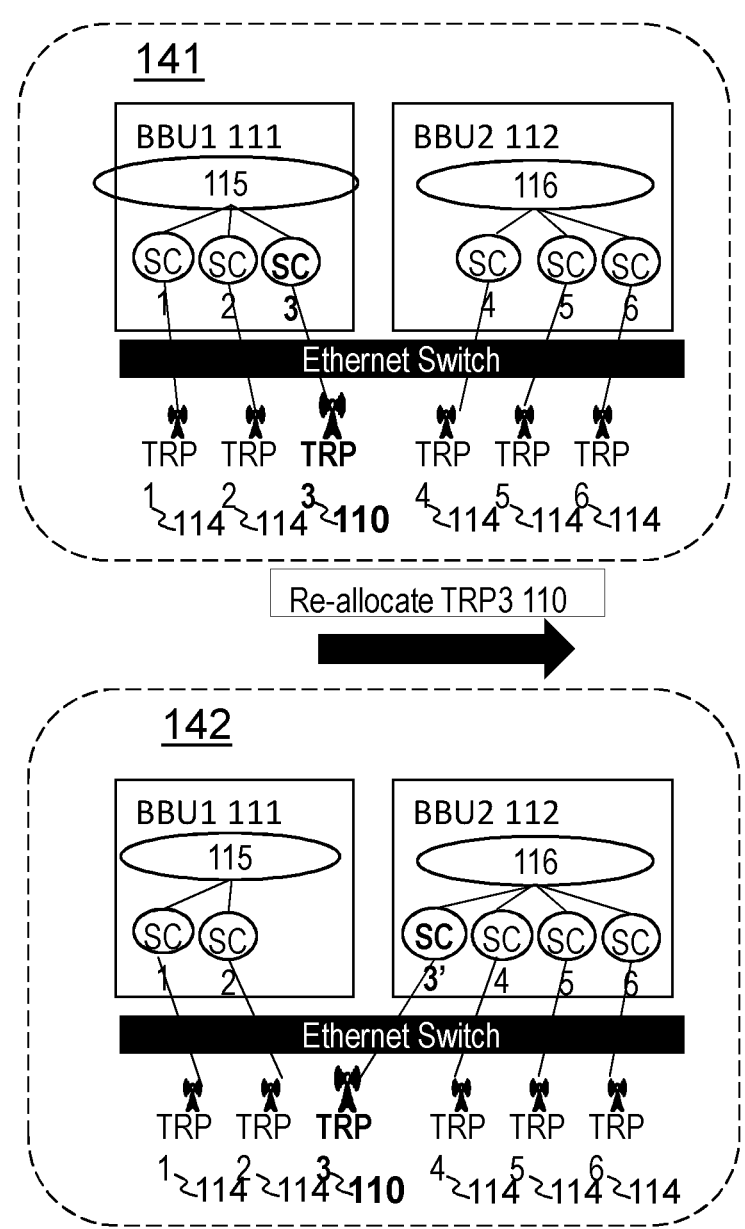

FIG. 1*c* depicts a more detailed example scenario of the wireless communications network 100 wherein embodiments herein may be implemented. Six TRPs, the TRP 110 and other TRPs 114, operate in this example scenario, TRP1, TRP2, TRP3, TRP4, TRP5, and TRP6. The TRP 110 is in this example and FIG. 1*c* represented by TRP3. The other TRPs 114 are in this example and FIG. 1*c* represented by TRP1, TRP2, TRP4, TRP5, and TRP6. An Ethernet switch is used to provide front haul connectivity between all BBUs and RRUs.

FIG. 1*c* depicts two example scenarios, one before and one after a re-allocation of one TRP, TRP3, such as the TRP 110 from one BBU, the first BBU 111, to another BBU, the second BBU 112. The top part of FIG. 1 b depicts a scenario before re-allocation 141 and the bottom part of FIG. 1 b depicts a scenario after re-allocation 142.

TRP1 is represented by Sector Carrier (SC) 1, TRP2 is represented by SC2, and TRP3 is represented by SC3 in cell 1 and are processed in a first BBU 111, referred to as BBU1.

TRP4 is represented by Sector Carrier SC4, TRP5 is represented by SC5, and TRP6 is represented by SC6 in cell 2 and are processed in a second BBU 112, referred to as BBU2.

According to embodiments herein, to re-allocate TRP3 from BBU1 to BBU2, the SC3 is removed from the first cell 115 and added as SC3' to the second cell 116. This means in other words, to re-allocate the TRP 110 from the first BBU 111 to the second BBU 112, a first sector carrier is removed from the first cell 115 and added as a second sector carrier to the second cell 116.

Figure 3:
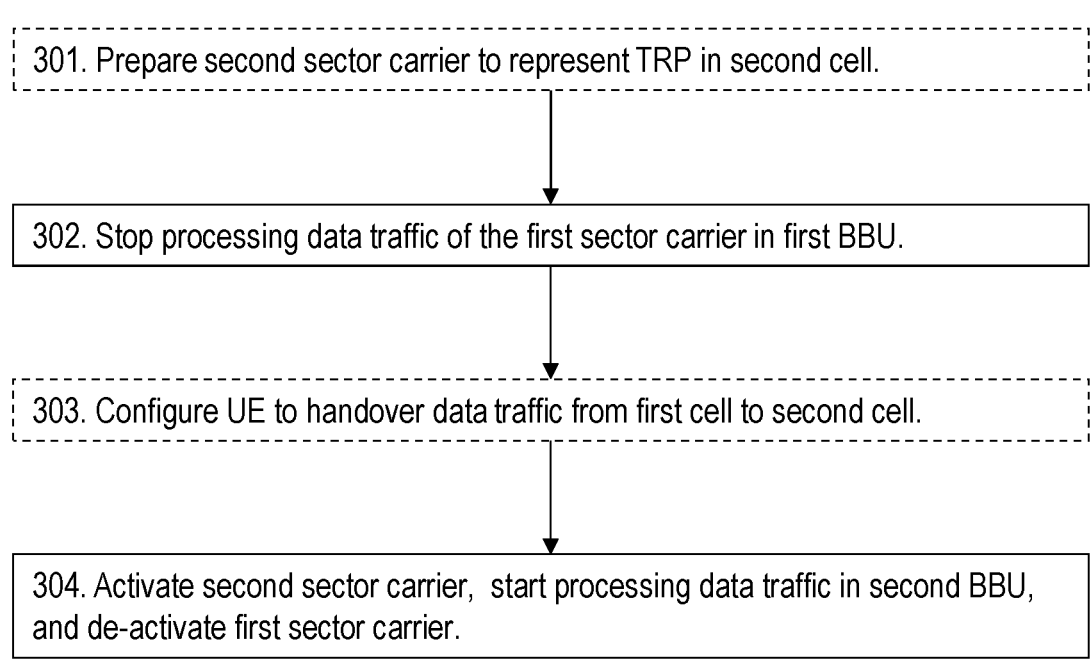
FIG. 3 is a flow chart depicting embodiments of a method in a TRP.

The method will first be described in as seen from the control node 130 perspective together with FIG. 2, and then as seen from the network node 109 perspective together with FIG. 3.

FIG. 2 shows example embodiments of a method performed by the control node 130 for handling data traffic between the TRP 110 and the UE 120 in the wireless communications network 100. The TRP 110 is related to the network node 110. This means that the network node 109 may manage or control the TRP 110 and data traffic in The control node 130 may be represented by any one out of: the TRP 110, or a distributed node, a centralized node or a management node in the cloud 140, the first BBU 111, the second BBU 112, a Core Network, CN, node in the wireless communications network 100. The data in the data traffic may comprise control data and/or user data.

The TRP 110 is serving the data traffic in a first sector carrier. The data traffic in the first sector carrier is processed by the first BBU 111.

The method comprises one or more of the following actions, which actions may be taken in any suitable order. Actions that are optional are marked with dashed boxes in the figure.

Action 201

In an example scenario with an ongoing communication of data traffic between the TRP 110 and the UE 120, the control node 130 deems that the processing of data traffic in the first BBU 111, e.g. including data traffic with other UEs, may become overloaded, or any other reason. To avoid an overload in the first BBU 111, the control node 130 decides to re-allocate the processing of the data traffic in the first BBU 111 to the second BBU 112. The second BBU 112 processes data traffic in a second sector carrier provided by the TRP 110.

The deciding to re-allocate the processing of the data traffic in the first BBU 111 to a second BBU 112 may be based on one or more criterion related to any one or more out of: Processor load, memory load, coordination performance, energy efficiency, in the first BBU 111 or operator decisions, for example site migration, relating to the first BBU 111.

When the re-allocation has been decided, the control node 130 controls the realization of the re-allocation by sending orders and instructions to the network node 109 according to the actions below.

Action 202

A preparation of the new second sector carrier for the TRP 110 is required. Thus, in some embodiments, the control node 130 sends a first order to the network node 109. The first order orders the network node 109, e.g. the second BBU 112 of the network node 109, to prepare the second sector carrier to represent the TRP 110 in the second cell 116. The preparation of the second sector carrier to represent the TRP 110 in the second cell 116 means that the second sector carrier such as e.g. SC3', is configured and added to the second 116 and connection between TRP 110 and BBU 112 is setup.

The second sector carrier for the TRP 110 may be also always pre-configured in the second BBU 112 or more BBUs to avoid the preparation step in run time.

Action 203

Further, the first sector carrier needs to stop processing the data traffic. Thus, the control node 130 sends a second order to the network node 109, e.g. to be sent to the first BBU 111, to stop processing the data traffic of the first sector carrier in the first BBU 111. This means that the first BBU 111 will stop to take new UEs on the first sector carrier and buffer the data traffic from the active UE 120. The order is sent to the first BBU 111 e.g. in the first cell 115.

Action 204.

The first BBU 111 may process data traffic in a first cell 115, and the second BBU 112 may process data traffic in a second cell 116.

The UE 120 may be directed to other neighbor cells. In some embodiments, the control node 130 sends an instruction to the network node 109, e.g. to be sent to the first BBU 111 through cell 115, to configure active UEs, e.g. comprising the UE 120, to handover the data traffic from the first cell 115 to the second cell 116.

Action 205

Further, the second sector carrier needs to be activated and the processing of the data traffic in the second BBU 112 requires to be started. Thus, the control node 130 sends a third order to the network node 109, e.g. to the second BBU 112 through the second cell 116, to activate the second sector carrier, start processing the data traffic in the second BBU 112, and e.g. to be sent to the first BBU 111 through the first cell 115 to deactivate the first sector carrier.

After configured UE 120 to handover to the second cell 116, the first BBU 111 may de-activate the first sector carrier and send confirmation back to the network node 110,130.

The re-allocation of the processing of the data traffic in the first BBU 111 to the second BBU 112 may be performed by a run-time switch. This is an advantage and means that there is no cell lock and/or unlock and/or re-configuration, and no drop of UE 120 data traffic.

In order to perform the re-allocation as a run-time switch, the orders of activating of the second sector carrier and the de-activating of the first sector carrier shall preferably be be coordinated so that the deactivation of the first sector carrier is done after the UE 120 is configured, e.g. RRC re-configured, to the second cell 116. The de-activation of the first sector carrier and the activation of the second sector carrier is done with a short interval so that the second sector carrier is activated before UE 120 completes the handover successfully.

The method will now be described as seen from the network node 109 perspective. FIG. 3 shows example embodiments of a method performed by the network node 109 for handling data traffic between the TRP 110 and the UE 120 in the wireless communications network 100. The TRP 110 is serving the data traffic in a first sector carrier. The data traffic in the first sector carrier is processed by the BBU 111. In some embodiments, the first BBU 111 processes data traffic in a first cell 115, and the second BBU 112 processes data traffic in a second cell 116.

The method comprises one or more of the following actions, which actions may be taken in any suitable order. Actions that are optional are marked with dashed boxes in the FIG.

Action 301

A first order may be received when the control node 130 has decided to re-allocate the processing of the data traffic in the first BBU 111 to a second BBU 112. The first order orders the NETWORK NODE 109 to prepare the second sector carrier to represent the TRP 110 in the second cell 116. Thus, in some embodiments, the network node 109 may prepare the second sector carrier to represent the TRP 110 in the second cell 116. This action is triggered by a first order received from the control node 130.

Action 302

The network node 109 receives a second order, ordering the TRP 110 to deactivate the first sector carrier and stop processing the data traffic of the first sector carrier in the first BBU 111. The network node 109 stops processing the data traffic of the first sector carrier in the first BBU 111. This action is triggered by the second order. The second order is received from the control node 130 in the wireless communications network 100 when the control node 130 has decided to re-allocate the processing of the data traffic in the first BBU 111 to a second BBU 112.

Action 303

The re-allocation of the processing of the data traffic in the first BBU 111 to the second BBU 112, may be performed by a run-time switch.

The network node 109 may receive an instruction, instructing the network node 109 to configure the UE 120 to handover the data traffic from the first cell 115 to the second cell 116.

In some embodiments, the network node 109 configures the UE 120 to handover the data traffic from the first cell 115 to the second cell 116. This is triggered by an instruction received from the control node 130 e.g. when the control node 130 has decided to re-allocate the processing of the data traffic in the first BBU 111 to a second BBU 112. The instruction is to configure the UE 120 to handover the data traffic from the first cell 115 to the second cell 116.

Action 304

The network node 109 receives a third order from the control node 130, ordering the network node 109 to activate the second sector carrier, and start processing the data traffic in the second BBU 112.

The network node 109 activates the second sector carrier, starts processing the data traffic in the second BBU 112, and deactivates the first sector carrier. The second BBU 112 processes data traffic in a second sector carrier provided by the TRP 110. This action is triggered by a third order received from the control node 130 e.g. when the control node 130 has decided to re-allocate the processing of the data traffic in the first BBU 111 to a second BBU 112.

In this way, by performing the methods described above, the load of the first and second BBUs 111, 112, are run-time balanced and at the same time the cell level management is kept.

The embodiments described above will now be further explained and exemplified. The example embodiments described below may be combined with any suitable embodiment above.

Figure 4:
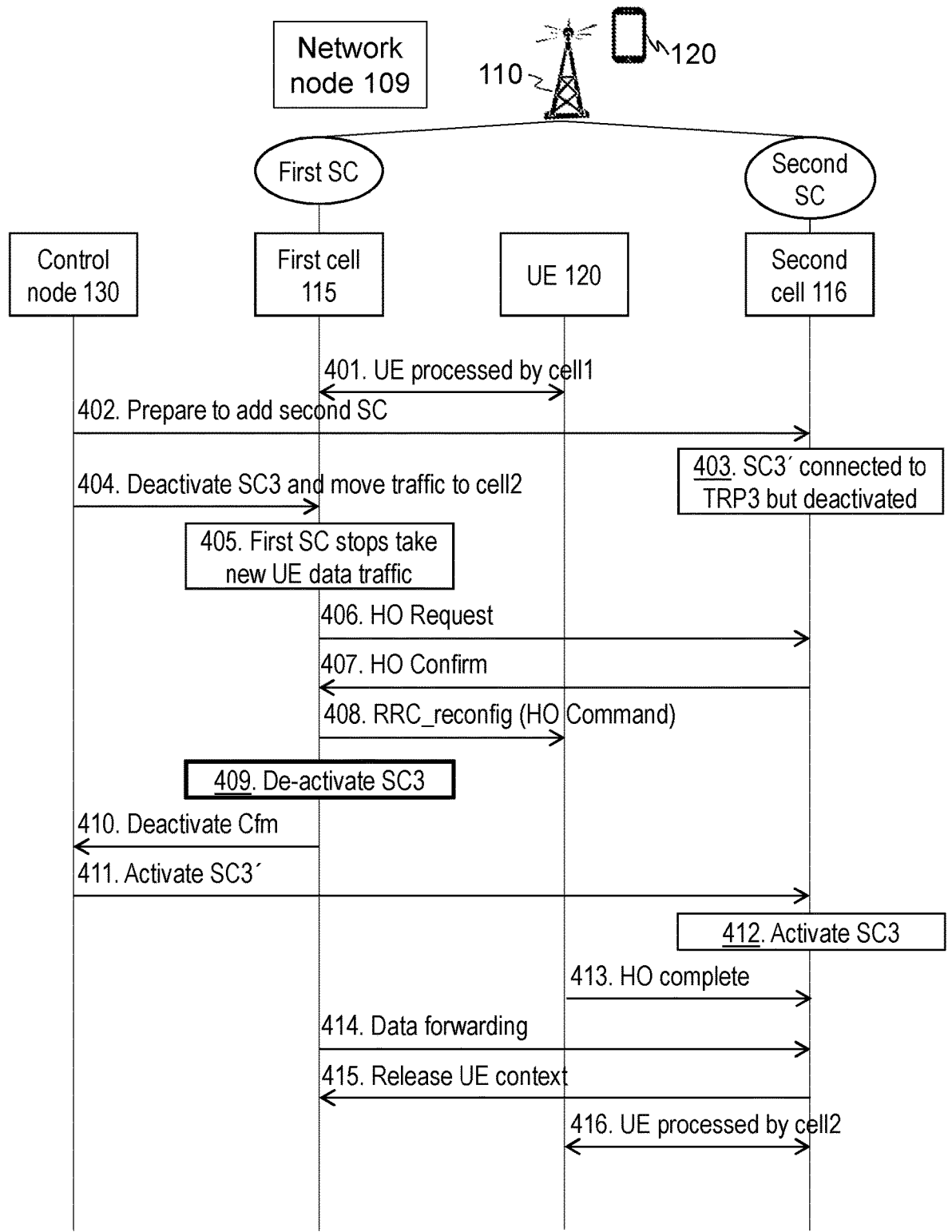
FIG. 4 is a sequence diagram depicting embodiments of a method in a wireless communication network.

FIG. 4 shows an example of actions of the procedure to re-allocate the processing of the data traffic in the first BBU 111 to a second BBU 112. The control node 130 decides to move the TRP 110 processing from the first cell 115 on the first BBU 111 to the second cell 116 on the second BBU 112. A sector carrier is referred to as SC in the FIG.

Action 401

The UE 120 data traffic in the first sector carrier is processed by the first BBU 111 in the first cell 115, referred to as the first cell 115.

Action 402

When the control node 130 has decided (See action 201) to re-allocate the processing of the data traffic in the first BBU 111 to a second BBU 112, the control node 130, sends the first order (See action 202) to the network node 109 e.g. to the second cell 116 provided by the TRP 110. The first order is to prepare the second sector carrier to represent the TRP 110 in the second cell, the second cell 116.

Action 403

The second sector carrier gets connected to the TRP 110 but is still deactivated.

Action 404

The control node 130, then sends the second order (See action 203) to the network node 109, e.g. to the first cell 115 provided by the TRP 110. The second order is to deactivate the first sector carrier and move the data traffic to the second cell 116.

Action 405

The first sector carrier and first BBU 111 stops take new UE 120 data traffic.

Action 406

A handover (HO) request is sent from the first cell 115 to the second cell 116.

Action 407

A HO confirmation from the second cell 116 to the first cell 115, if the HO is possible.

Action 408

An RRC reconfiguration is sent from the first cell 115 to the second cell 116. e.g. in a HO Command.

Action 409

The first sector carrier is then de-activated.

Action 410

The first sector carrier deactivation is confirmed (Cfm) to the control node 130. (See action 204)

Action 411

The control node 130, then sends the third order (See action 203) to the network node 109, e.g. through the second cell 116 provided by the TRP 110. The second order is to activate the second sector carrier.

Action 412

The second sector carrier is activated according to the third order. (See action 304.)

Action 413

The UE 120 accesses to the second cell 116 and sends a HO complete message to the second cell 116 of the TRP 110, when the HO is completed.

Action 414

The data traffic of the UE 120 is then forward via the second cell, the first cell 115.

Action 415

A release UE 120 context message is sent from the second cell 116 to the first cell 115. The first sector carrier may now be removed from the first cell 115.

Action 416

The UE data traffic in the second sector carrier is now processed by the second BBU 112 in the second cell 115. Thus the TRP 110 is successfully switched to the second BBU 112.

These methods as described above, run-time switch TRP processing to different BBU HW, such as the first BBU 111 and the second BBU 112, is enabled. This further enables pooling of BBU HW, such as the first BBU 111 and the second BBU 112, to allow scaling HW utilization with traffic load. The benefit may be lower CAPEX & OPEX due to efficient HW utilization, energy efficiency and better network performance with run-time optimized coordination.

A significant action provided herein is to enable one TRP 110 as a sector carrier in a Multi-TRP cell on both source BBU, such as the first BBU 111, and target BBU such as the second BBU 112, and run-time switch the processing of the TRP 110 traffic by de-activate one of the sector carriers such as the first sector carrier and activate another of the sector carriers such as the second sector carrier.

According to some embodiments herein:

The TRP 110 is represented by 2 sector carriers, one sector carrier on the source BB HW such as the first sector carrier on the first BBU 111, and one sector carrier on the target BB HW, such as the second sector carrier on the second BBU 11.

The two sector carriers, such as the first and second sector carriers are not activate at the same time.

The switch of the TRP processing, such as the re-allocation of the processing of the data traffic from the first BBU 111 to the second BBU 112 is performed by deactivating the first sector carrier on the first BBU 111 and activate the second sector carrier on the second BBU 112.

The two sector carriers, such as the first and second sector carriers belongs to respective operational cells such as the first cell 115 and the second cell 116, the on source and target BB HW, such as the first BBU 111 and the second BBU 112.

A controller, such as the control node 130 triggers the switch from the first cell 115 in the source BBU such as the first BBU 111 and handover of UE data traffic to the second cell 116 on target BB HW such as the second BBU 112.

The handover procedure is coordinated with the de-activation of the first sector carrier and activation of the second sector carrier, so UE 120 ongoing communication of data traffic is not dropped.

Figure 5A:
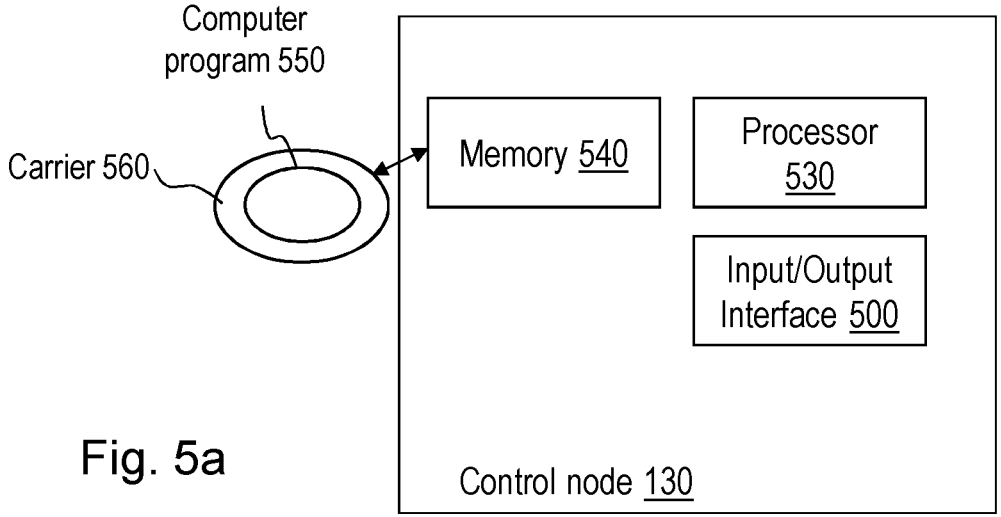
FIGS. 5a and b are schematic block diagrams depicting embodiments of a network node.

To perform the action as mentioned above, the control node 130 may comprise the arrangement as shown in FIGS. 5a and b. The control node 130 is configured to handle data traffic between the TRP 110 and the UE 120 in the wireless communications network 100. The TRP is related to a network node 109. The TRP 110 is adapted to serve data traffic in a first sector carrier. The data traffic in the first sector carrier further is adapted to be processed by the first BBU 111.

The control node 130 may comprise a respective input and output interface 500 configured to communicate with the TRP 110, see FIG. 5a. The input and output interface 500 may comprise a wireless receiver (not shown) and a wireless transmitter (not shown).

The control node 130 is further configured to, e.g. by means of a deciding unit 510 in the control node 130, decide to re-allocate the processing of the data traffic in the first BBU 111 to a second BBU 112. The second BBU 112 is adapted to process data traffic in a second sector carrier provided by the TRP 110.

The decision to re-allocate the processing of the data traffic in the first BBU 111 to a second BBU, may be adapted to be based on one or more criterion related to any one or more out of: processor load, memory load, coordination performance.

The re-allocation of the processing of the data traffic in the first BBU 111 to the second BBU 112, may be adapted to be performed as a run-time switch.

The first BBU 111 may be configured to process data traffic in a first cell 115, and the second BBU 112 is configured to process data traffic in a second cell 116.

The control node 130 may be adapted to be represented by any one out of: A control node 130, the TRP 110, a distributed node in a cloud 140, the first BBU 111, the second BBU 112, a Core Network, CN, node in the wireless communications network 100.

The control node 130 is further configured to, e.g. by means of a sending unit 520 in the control node 130, send a second order to the network node 109. The second order is to stop processing the data traffic of the first sector carrier in the first BBU 111.

The control node 130 is further configured to, e.g. by means of the sending unit 520 in the control node 130, send a third order to the network node 109. The third order is to activate the second sector carrier, start processing the data traffic in the second BBU 112 and to deactivate the first sector carrier.

In some embodiments the control node 130 is further configured to, e.g. by means of the sending unit 520 in the control node 130, send a first order to the network node 109. The first order is to prepare the second sector carrier to represent the TRP 110 in the second cell 116.

In some embodiments the control node 130 is further configured to, e.g. by means of the sending unit 520 in the control node 130, send an instruction to the network node 109. The instruction is to configure active UEs, e.g. the UE 120, on the first sector carrier to handover the data traffic from the first cell 115 to the second cell 116.

Figure 5B:
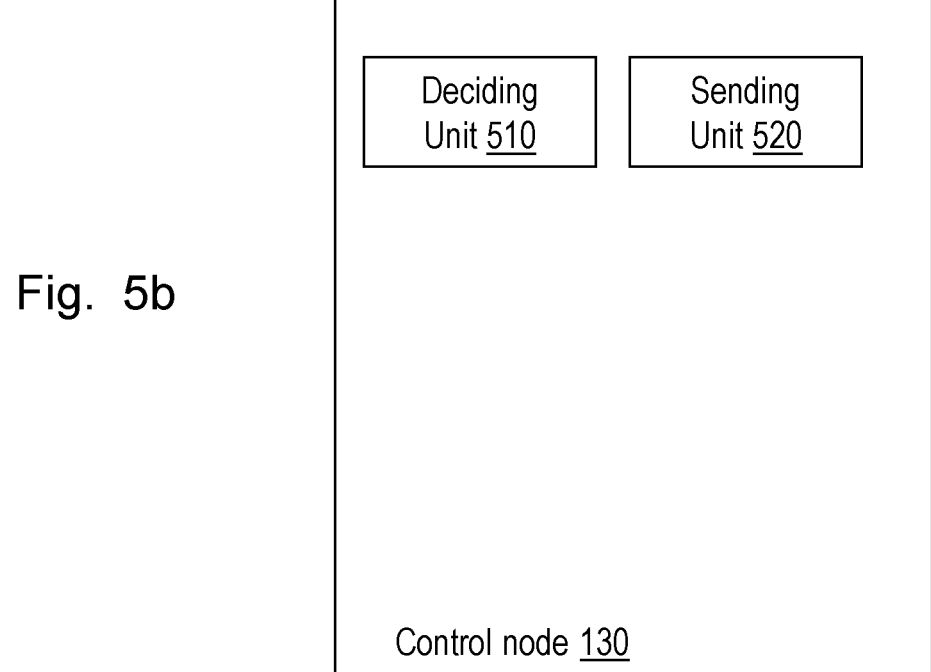

The embodiments herein may be implemented through a respective processor or one or more processors, such as a processor 530 of a processing circuitry in the control node 130, depicted in FIGS. 5 a and b, together with computer program code for performing the functions and actions of the embodiments herein. The program code mentioned above may also be provided as a computer program product, for instance in the form of a data carrier carrying computer program code for performing the embodiments herein when being loaded into the control node 130. One such carrier may be in the form of a CD ROM disc. It is however feasible with other data carriers such as a memory stick. The computer program code may furthermore be provided as pure program code on a server and downloaded to the control node 130.

The control node 130 may further comprise a respective memory 540 comprising one or more memory units. Each memory 540 comprises instructions executable by the processor 530 in the control node 130.

Each respective memory 540 is arranged to be used to store orders, requirements, information, data, configurations, and applications to perform the methods herein when being executed in the control node 130.

In some embodiments, a respective computer program 550 comprises instructions, which when executed by the at least one processor 530, cause the at least one processor 530 of the control node 130 to perform the actions above.

In some embodiments, a respective carrier 560 comprises the respective computer program 550, wherein the carrier 560 is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the network node 110, that when executed by the respective one or more processors such as the processors or processor circuitry described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

To perform the action as mentioned above, the TRP 110 may comprise the arrangement as shown in FIGS. 6 a and b. The TRP 110 is configured to handle data traffic between the TRP 110 and a UE 120 in a wireless communications network 100. The TRP 110 is related to a network node 109. The TRP 110 is adapted to serve the data traffic in a first sector carrier. The data traffic in the first sector carrier is adapted to be processed by a first BBU 111.

Figures 6A, 6B:
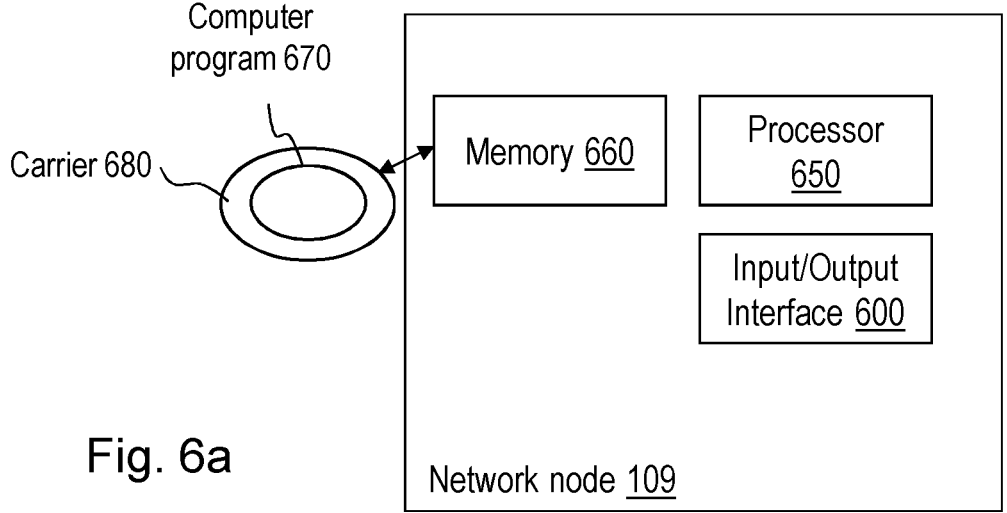
FIGS. 6a and b are schematic block diagrams depicting embodiments of a TRP.

The TRP 110 may comprise a respective input and output interface 600 configured to communicate with the control node 130, see FIG. 6a. The input and output interface 600 may comprise a wireless receiver (not shown) and a wireless transmitter (not shown).

The TRP 110 is further configured to, e.g. by means of a preparing unit 610 in the TRP 110, triggered by a first order, prepare the second sector carrier to represent the TRP 110 in the second cell 116. The first order is adapted to be received from the control node 130.

The TRP 110 is further configured to, e.g. by means of a stopping unit 620 in the TRP 110, triggered by a second order, stop processing the data traffic of the first sector carrier in the first BBU 111. The second order is adapted to be received from a control node 130 in the wireless communications network 100 when decided to re-allocate the processing of the data traffic in the first BBU 111 to a second BBU 112.

The TRP 110 is further configured to, e.g. by means of a configuring unit 630 in the TRP 110, triggered by an instruction, configure the UE 120 to handover the data traffic from the first cell 115 to the second cell 116. The instruction is adapted to be received from the control node 130.

The TRP 110 is further configured to, e.g. by means of an activating unit 640 and a de-activating unit 145 in the TRP 110, triggered by a third order, activate the second sector carrier, start processing the data traffic in the second BBU 112, and deactivate the first sector carrier. The third order is adapted to be received from the control node 130. The second BBU 112 is adapted to process data traffic in a second sector carrier provided by the TRP 110.

The re-allocation of the processing of the data traffic in the first BBU 111 to the second BBU 112 may be adapted to be performed as a run-time switch.

The first BBU 111 may be configured to process data traffic in a first cell 115, and wherein the second BBU 112 is configured to process data traffic in a second cell 116.

The embodiments herein may be implemented through a respective processor or one or more processors, such as the processor 650 of a processing circuitry in the TRP 110, depicted in FIGS. 6 a and b, together with computer program code for performing the functions and actions of the embodiments herein. The program code mentioned above may also be provided as a computer program product, for instance in the form of a data carrier carrying computer program code for performing the embodiments herein when being loaded into the network node 109. One such carrier may be in the form of a CD ROM disc. It is however feasible with other data carriers such as a memory stick. The computer program code may furthermore be provided as pure program code on a server and downloaded to the network node 109.

The TRP 110 may further comprise a respective memory 660 comprising one or more memory units. Each memory comprises instructions executable by the processor 650 in the TRP 110. Each respective memory 660 is arranged to be used to store orders, requirements, information, data, configurations, and applications to perform the methods herein when being executed in the TRP 110.

In some embodiments, a respective computer program 670 comprises instructions, which when executed by the at least one processor 650, cause the at least one processor 650 of the TRP 110 to perform the actions above.

In some embodiments, a respective carrier 680 comprises the respective computer program 670, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the network node 110, that when executed by the respective one or more processors such as the processors or processor circuitry described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Further Extensions and Variations

Figure 7:
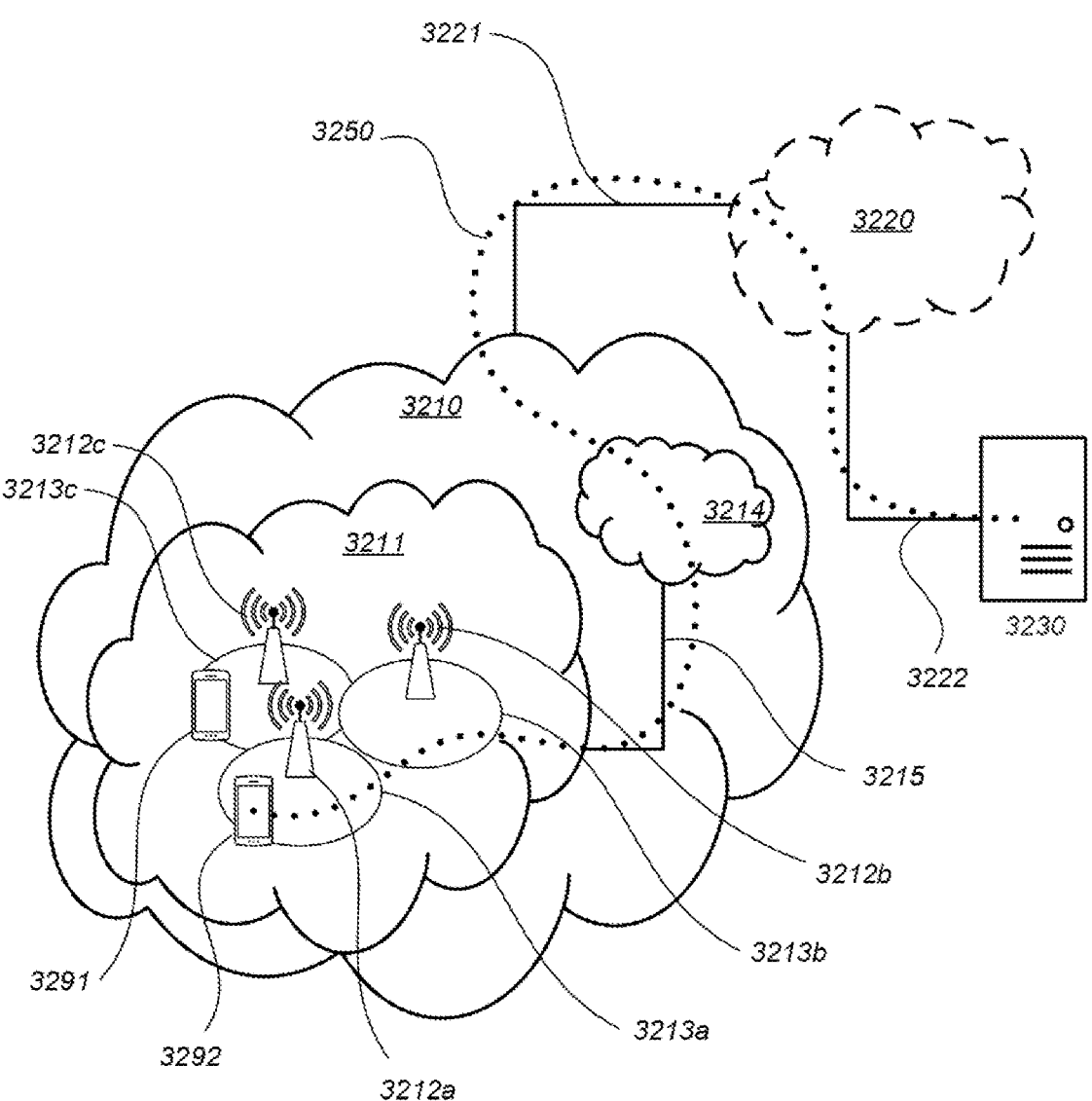
FIG. 7 schematically illustrates a telecommunication network connected via an intermediate network to a host computer.

With reference to FIG. 7, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 109, access nodes, AP STAs N Bs, eNBs, gN Bs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
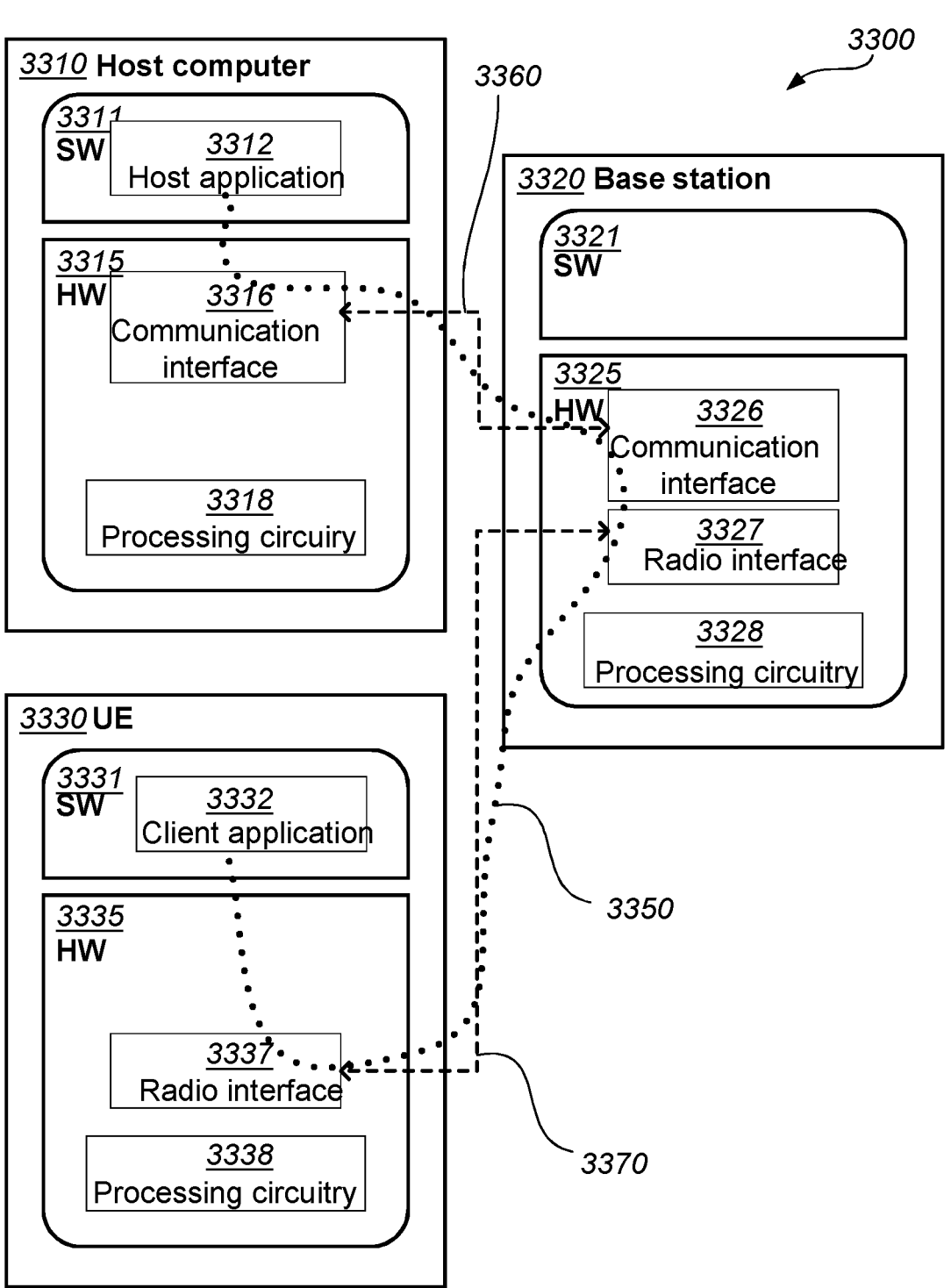
FIG. 8 is a generalized block diagram of a host computer communicating via a base station with a user equipment over a partially wireless connection.
Figures 9, 10:
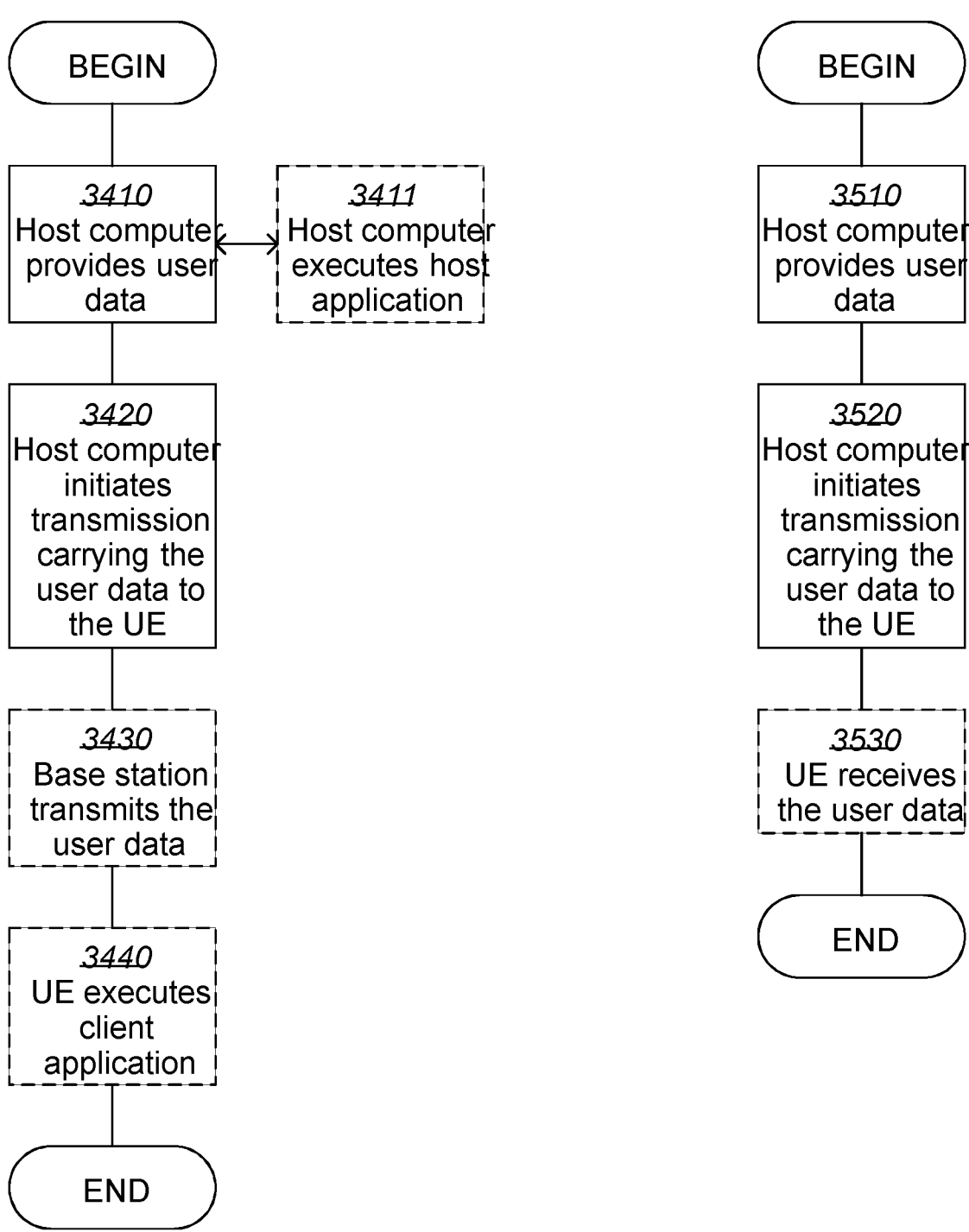
FIGS. 9 to 12 are flowcharts illustrating methods implemented in a communication system including a host computer, a base station and a user equipment.

It is noted that the host computer 3310, base station 3320 and UE 3330 illustrated in FIG. 8 may be identical to the host computer 3230, one of the base stations 3212*a*, 3212*b*, 3212*c* and one of the UEs 3291, 3292 of FIG. 9, respectively. This is to say, the inner workings of these entities may be as shown in FIG. 8 and independently, the surrounding network topology may be that of FIG. 7.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 9 is a flowchart illustrating a method implemented in a communication system, in accordance with one embodiment. The communication system includes a host computer, a base station such as the network node 110, and a UE such as the UE 120, which may be those described with reference to FIG. 7 and FIG. 8. For simplicity of the present disclosure, only drawing references to FIG. 9 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 10 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 10 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 11, 12:
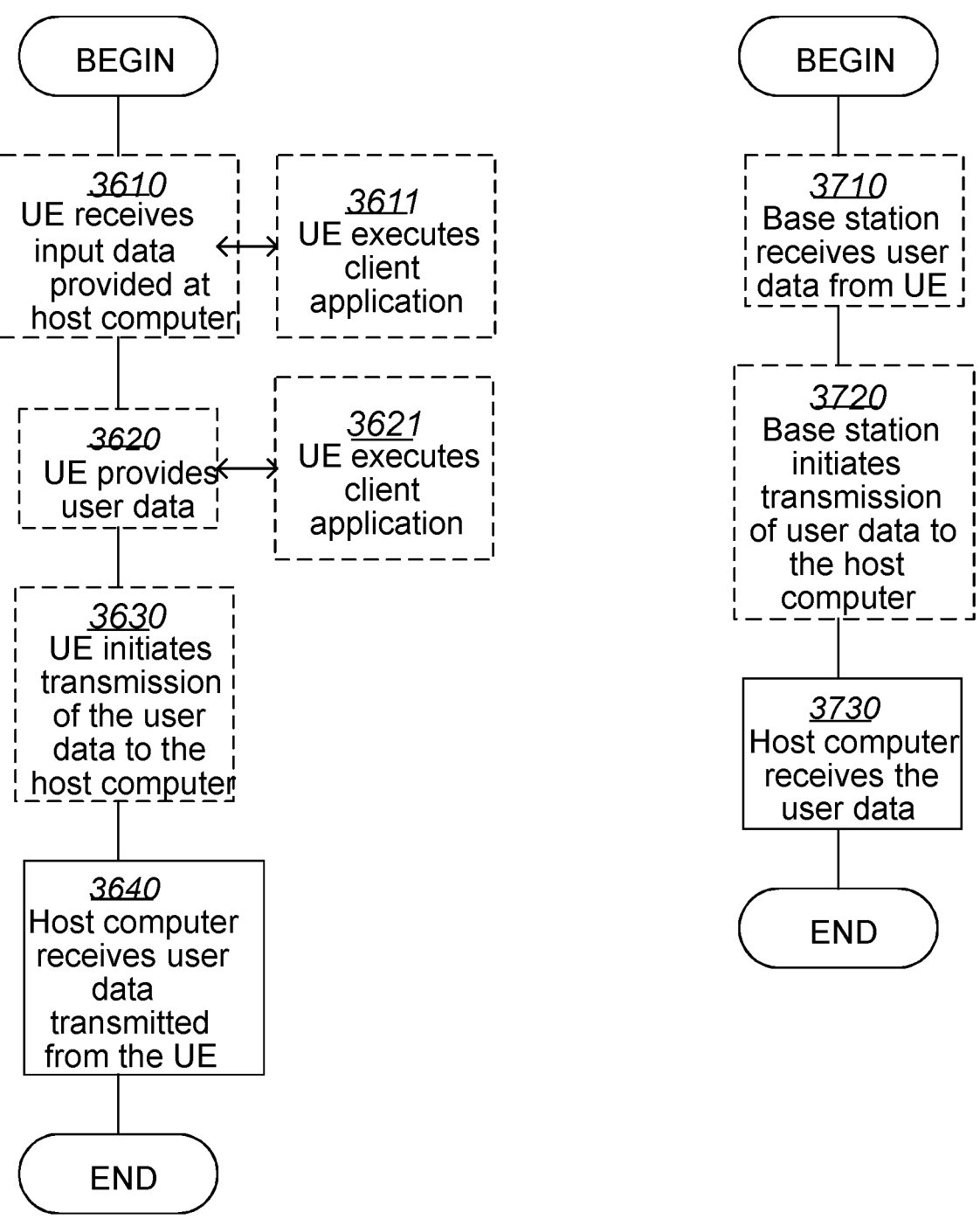

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 11 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station such as an AP STA, and a UE such as a Non-AP STA which may be those described with reference to FIG. 7 and FIG. 8. For simplicity of the present disclosure, only drawing references to FIG. 12 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a control node for handling data traffic between a Transmission and Reception Point (TRP) and at least a first user equipment (UE) in a wireless communications network, wherein the TRP is controlled by a network node and allocated to a first baseband unit (BBU) for processing data traffic, the method comprising:
the control node deciding to reduce a load on the first BBU; and
in response to the control node deciding to reduce the load of the first BBU, the control node performing a TRP reallocation process for reallocating the TRP from the first BBU to a second BBU, wherein
the first BBU processes data traffic in a first cell,
the second BBU processes data traffic in a second cell, and
the TRP reallocation process for reallocating the TRP from the first BBU to a second BBU comprises:
sending a first order to the network node to prepare a second sector carrier to represent the TRP in the second cell;
sending a second order to the network node to stop processing data traffic of a first sector carrier in the first cell;

sending an instruction to the network node to configure the first UE on the first sector carrier to handover the data traffic from the first cell to the second cell; and
sending a third order to the network node to activate the second sector carrier, start processing the data traffic in the second BBU, and deactivate the first sector carrier.

2. The method of claim 1, wherein
prior to deciding to reduce the load of the first BBU, the TRP is represented by the first sector carrier allocated to the first cell.

3. The method of claim 1, wherein the deciding to reduce the load on the first BBU is based on:
a processor load, a memory load, a coordination performance, and/or an energy efficiency.

4. The method of claim 1, wherein TRP reallocation process is performed as a run-time switch.

5. A non-transitory computer readable medium storing a computer program comprising instructions, which when executed by a processor of the control node, causes the control node to perform the method of claim 1.

6. A method performed by a network node for handling data traffic between a Transmission and Reception Point (TRP) and at least a first user equipment (UE) in a wireless communications network, wherein the TRP is controlled by the network node and allocated to a first baseband unit (BBU) for processing data traffic, the method comprising:
receiving a first message transmitted by a control node that has decided to reduce the load of the first BBU and increase the load of a second BBU; and
in response receiving the first message performing a TRP reallocation process for reallocating the TRP from the first BBU to the second BBU, wherein
the first BBU processes data traffic in a first cell,
the second BBU processes data traffic in a second cell, and
the TRP reallocation process for reallocating the TRP from the first BBU to the second BBU comprises:
preparing a second sector carrier to represent the TRP in the second cell;
stopping processing data traffic of a first sector carrier in the first cell;
configuring the first UE on the first sector carrier to handover the data traffic from the first cell to the second cell; and
activating the second sector carrier, start processing the data traffic in the second BBU, and deactivate the first sector carrier.

7. The method of claim 6, wherein
at the time the first order message is received, the TRP is represented by the first sector carrier allocated to the first cell.

8. The method of claim 6, wherein the TRP reallocation process is performed as a run-time switch.

9. A non-transitory computer readable medium storing a computer program comprising instructions, which when executed by a processor of a network node causes the network node to perform the method of claim 6.

10. A control node configured to handle data traffic between a Transmission and Reception Point (TRP) and at least a first user equipment (UE) in a wireless communications network, wherein the TRP is controlled by a network node and allocated to a first baseband unit (BBU) for processing data traffic, the control node comprising:
memory; and processing circuitry, wherein the memory stores instructions executable by the processing circuitry, and the control node is configured to perform a method comprising:

deciding to reduce a load on the first BBU; and in response to deciding to reduce the load of the first BBU, performing a TRP reallocation process for reallocating the TRP from the first BBU to a second BBU, wherein the first BBU processes data traffic in a first cell, the second BBU processes data traffic in a second cell, and the TRP reallocation process for reallocating the TRP from the first BBU to a second BBU comprises:

sending a first order to the network node to prepare a second sector carrier to represent the TRP in the second cell;

sending a second order to the network node to stop processing data traffic of a first sector carrier in the first cell;

sending an instruction to the network node to configure the first UE on the first sector carrier to handover the data traffic from the first cell to the second cell; and sending a third order to the network node to activate the second sector carrier, start processing the data traffic in the second BBU, and deactivate the first sector carrier.

11. The control node of claim 10, wherein the deciding to reduce the load on the first BBU is based on:

a processor load, a memory load, a coordination performance, and/or an energy efficiency.

12. The control node of claim 10, wherein the TRP reallocation process is performed as a run-time switch.

13. A network node configured to handle data traffic between a Transmission and Reception Point (TRP) and at least a first user equipment (UE) in a wireless communications network, wherein the TRP is controlled by the network node and allocated to a first baseband unit (BBU) for processing data traffic, the network node comprising:

memory; and processing circuitry, wherein the memory stores instructions executable by the processing circuitry, and the network node is configured to perform a method comprising:

receiving a first message transmitted by a control node that has decided to reduce the load of the first BBU and increase the load of a second BBU; and in response receiving the first message performing a TRP reallocation process for reallocating the TRP from the first BBU to the second BBU, wherein the first BBU processes data traffic in a first cell, the second BBU processes data traffic in a second cell, and the TRP reallocation process for reallocating the TRP from the first BBU to the second BBU comprises:

preparing a second sector carrier to represent the TRP in the second cell;

stopping processing data traffic of a first sector carrier in the first cell;

configuring the first UE on the first sector carrier to handover the data traffic from the first cell to the second cell; and activating the second sector carrier, start processing the data traffic in the second BBU, and deactivate the first sector carrier.

14. The network node of claim 13, wherein at the time the first order message is received, the TRP is represented by the first sector carrier allocated to the first cell.

15. The network node of claim 13, wherein the TRP reallocation process is performed as a run-time switch.

\*   \*   \*   \*   \*